United States Patent
DeLuca et al.

(10) Patent No.: US 10,178,231 B2
(45) Date of Patent: *Jan. 8, 2019

(54) MULTIPLE PARTY CALL ACKNOWLEDGEMENT

(71) Applicant: International Business Machines Corporation, Armonk, NY (US)

(72) Inventors: Lisa Seacat DeLuca, Baltimore, MD (US); Jeremy A. Greenberger, Raleigh, NC (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,255

(22) Filed: Mar. 20, 2018

(65) Prior Publication Data

US 2018/0234542 A1    Aug. 16, 2018

Related U.S. Application Data

(63) Continuation of application No. 15/432,233, filed on Feb. 14, 2017, now Pat. No. 9,973,628.

(51) Int. Cl.
*H04M 3/46* (2006.01)
*H04M 1/2745* (2006.01)
(Continued)

(52) U.S. Cl.
CPC ..... *H04M 3/465* (2013.01); *H04M 1/274575* (2013.01); *H04M 3/42195* (2013.01);
(Continued)

(58) Field of Classification Search
CPC ..... H04W 12/02; H04W 12/08; H04W 28/16; H04W 4/00; H04W 76/15; H04W 80/00;
(Continued)

(56) References Cited

U.S. PATENT DOCUMENTS 5,475,748 A    12/1995    Jones
5,943,410 A    8/1999    Shaffer et al.
(Continued)

FOREIGN PATENT DOCUMENTS

| EP | 2739026 A1 | 6/2014 |
|---|---|---|
| WO | 2007072205 A2 | 6/2007 |
| WO | 2010002909 A2 | 1/2010 |

OTHER PUBLICATIONS

Lindsey, Amy, "What is a Phone Tree?", www.phonetree.com, Oct. 5, 2015, 3 pgs.
(Continued)

*Primary Examiner* — Diane Mizrahi
(74) *Attorney, Agent, or Firm* — Michael P. O'Keefe; Maxine L. Barasch; Keohane & D'Alessandro, PLLC

(57) ABSTRACT

Disclosed embodiments provide improved communication between a caller and multiple parties. A caller performs a call spray operation on a group of contacts using an electronic communication device such as a mobile telephone. The call spray operation attempts to contact an electronic device associated with each contact in the group of contacts. If one of the contacts answers and is deemed to be a live user, then the remaining contacts that did not answer each receive a message on their associated electronic device indicating which of the contacts answered the caller with a live user. In this way, a group of people can be conveniently contacted and kept up to date with the status of the communication with the caller.

20 Claims, 15 Drawing Sheets

(51) Int. Cl.
*H04M 3/42* (2006.01)
*H04M 3/56* (2006.01)

(52) U.S. Cl.
CPC ......... *H04M 3/42221* (2013.01); *H04M 3/56* (2013.01); *H04M 2203/2027* (2013.01); *H04M 2203/2044* (2013.01); *H04M 2203/256* (2013.01); *H04M 2203/4536* (2013.01); *H04M 2203/5063* (2013.01); *H04M 2203/654* (2013.01); *H04M 2250/12* (2013.01)

(58) Field of Classification Search
CPC ..... H04W 80/04; H04W 84/04; H04W 84/12; H04W 88/06; H04W 8/02; H04M 3/56; H04M 3/42059; H04M 3/42221; H04M 3/4228; H04M 3/42323; H04M 3/4931; H04M 3/51; H04M 2203/654
See application file for complete search history.

(56) References Cited

U.S. PATENT DOCUMENTS

| | | | |
|---|---|---|---|
| 9,973,628 B1 * | 5/2018 | DeLuca | H04M 3/465 |
| 2012/0196580 A1 | 8/2012 | Simmons et al. | |
| 2012/0278388 A1 | 11/2012 | Kleinbart et al. | |
| 2013/0156169 A1 | 6/2013 | Alberth et al. | |
| 2017/0054770 A1 * | 2/2017 | Wells | H04L 65/403 |

OTHER PUBLICATIONS

Mizrahi, Diane D., U.S. Appl. No. 15/432,233, Office Action dated Sep. 5, 2017, 15 pgs.

Mizrahi, Diane D., U.S. Appl. No. 15/432,233, Notice of Allowance dated Jan. 10, 2018, 5 pgs.

* cited by examiner

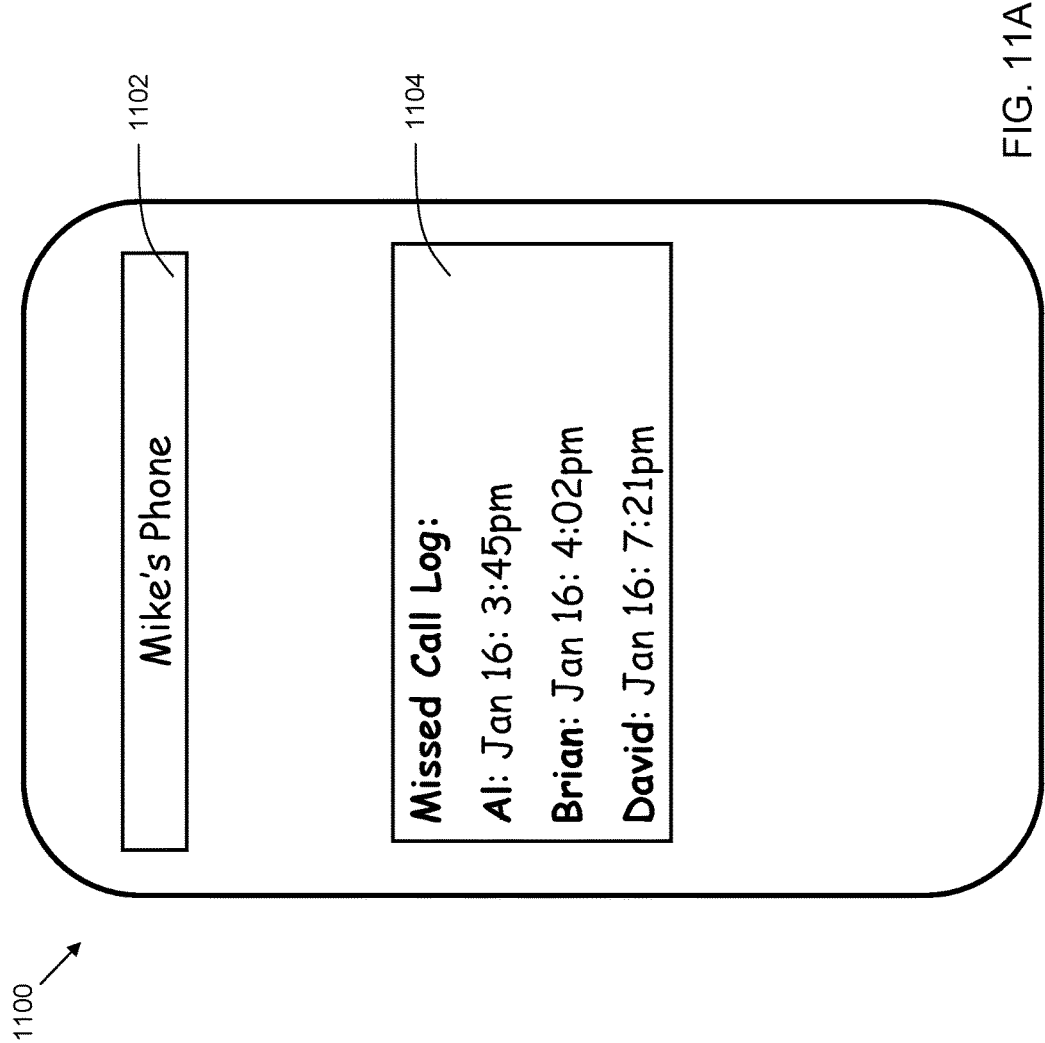

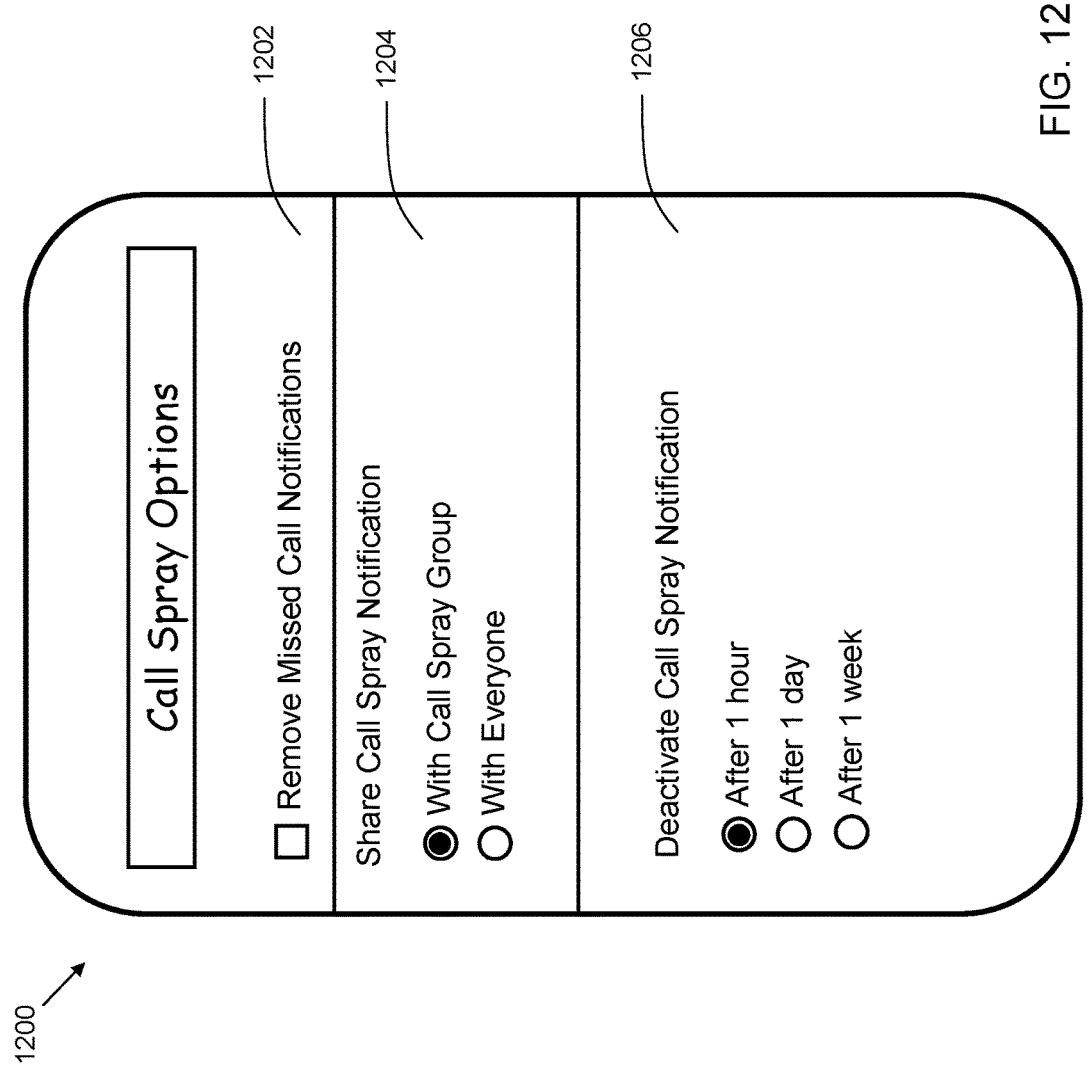

MULTIPLE PARTY CALL ACKNOWLEDGEMENT

The present patent document is a continuation of U.S. patent application Ser. No. 15/432,233, filed Feb. 14, 2017, entitled "MULTIPLE PARTY CALL ACKNOWLEDGEMENT", the disclosure of which is incorporated herein by reference.

BACKGROUND

This disclosure relates generally to telephony, and more particularly, to multiple party call acknowledgment. Smartphones and other personal electronic devices allow users to save contact information of a multitude of people. These people may be friends, family, colleagues, or coworkers, etc., of the user. In various situations, a user may wish to call all, or a subset of, the contacts in his/her contact lists. This can sometimes cause confusion amongst the recipients of the calls. Thus, there exists a need for improvements in multiple party calling.

SUMMARY

In one aspect, embodiments provide a computer-implemented method for performing a multiple party call acknowledgement, comprising: receiving a plurality of contacts on a call processing system from an electronic device of a caller; initiating a connection attempt to each of the plurality of contacts with the call processing system; in response to connecting with an electronic device of a live user associated with one contact of the plurality of contacts, configuring a call spray event notification that is associated with each of the plurality of contacts for which a connection is not established.

In another aspect, embodiments provide an electronic communication device comprising: a processor; a memory coupled to the processor, the memory containing instructions, that when executed by the processor, perform the steps of: receiving a plurality of contacts on a call processing system from an electronic device of a caller; initiating a connection attempt to each of the plurality of contacts with the call processing system; and configuring, in response to connecting with an electronic device of a live user associated with one contact of the plurality of contacts, a call spray event notification that is associated with each of the plurality of contacts for which a connection is not established.

In yet another aspect, embodiments provide a computer program product for performing a multiple party call acknowledgement, for an electronic computing device comprising a computer readable storage medium having program instructions embodied therewith, the program instructions executable by a processor to cause the electronic computing device to: receive a plurality of contacts on a call processing system from an electronic device of a caller; initiate a connection attempt to each of the plurality of contacts with the call processing system; and configure, in response to connecting with an electronic device of a live user associated with one contact of the plurality of contacts, a call spray event notification that is associated with each of the plurality of contacts for which a connection is not established.

BRIEF DESCRIPTION OF THE DRAWINGS

Features of the disclosed embodiments will be more readily understood from the following detailed description of the various aspects of the invention taken in conjunction with the accompanying drawings.

FIG. 11A shows an exemplary user interface indicating a plurality of missed call notifications.

FIG. 12 shows an exemplary user interface for establishing configuration options.

Figure 1:
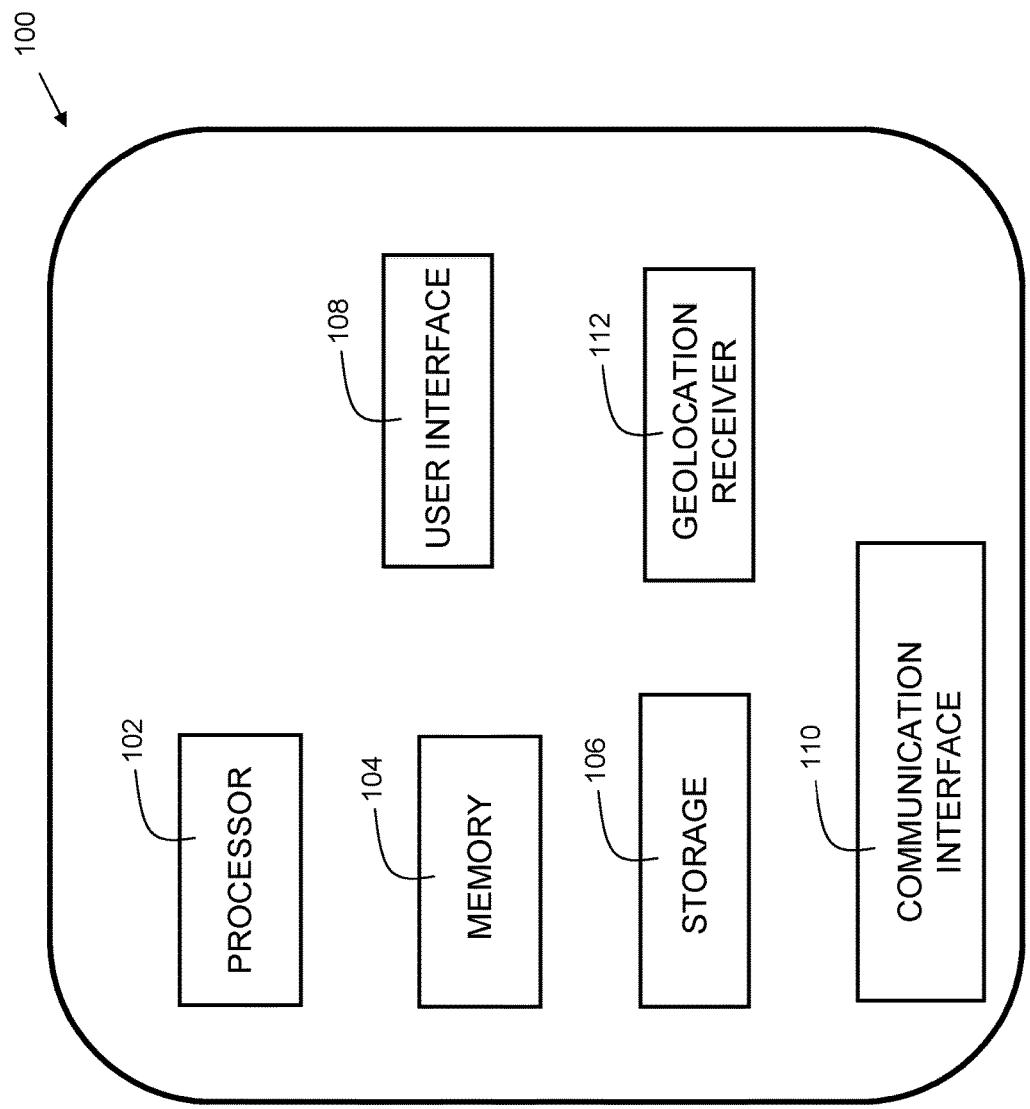
FIG. 1 is a block diagram of a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide improved communication between a caller and multiple parties. In particular, disclosed embodiments provide a multiple party call acknowledgement. A caller performs a call spray operation on a group of contacts using an electronic communication device such as a mobile telephone. The call spray operation attempts to contact each contact in the group of contacts. If at least one of the contacts answers and is deemed to be a live user, then the remaining contacts that did not answer may each receive a message indicating which of the contacts answered the call as a live user, and in some embodiments, additional information. In this way, a group of people can be conveniently contacted and kept up to date with the status of the communication with the caller.

A non-limiting example use case for disclosed embodiments is in the case of a health-related situation. As an example, a person who is feeling ill and needs assistance can perform a call spray operation on a group of contacts. The contacts may be close family or friends of the user. Once a contact answers, and is determined to be a live user, the remaining contacts that are part of the call spray group are sent a message that includes information about the connection with the live user that was established. This allows important information to be quickly and efficiently disseminated amongst the members of the call spray group. In some embodiments, caller biometric information and/or other sensor data may be included in the message.

Another non-limiting example use case for disclosed embodiments is a situation where the electronic device of a caller has a very low battery level, and the caller needs to reach someone as soon as possible, but the electronic device of the caller may not have sufficient battery life to attempt multiple calls. In this case, a call spray operation can streamline the calling by simultaneously calling multiple electronic devices associated with members of the call spray group, and connecting the caller with the electronic device associated with the first live user to answer. Thus, the caller is able to make contact with someone in the case of an electronic device with limited battery life remaining.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a block diagram of a device in accordance with embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Memory 104 includes instructions, which when executed by the processor, implement steps of the present invention. In embodiments, device 100 may have multiple processors 102, and/or multiple cores per processor.

Device 100 may further include storage 106. In embodiments, storage 106 may include one or more magnetic storage devices such as hard disk drives (HDDs). Storage 106 may include one or more solid state drives (SSDs). Any other storage device may be included instead of, or in addition to, those disclosed herein.

Device 100 further includes a user interface 108, examples of which include a liquid crystal display (LCD), a plasma display, a cathode ray tube (CRT) display, a light emitting diode (LED) display, an organic LED (OLED) display, or other suitable display technology. The user interface 108 may further include a keyboard, mouse, and/or a touch screen, incorporating a capacitive or resistive touch screen in some embodiments.

The device 100 further includes a communication interface 110. In embodiments, the communication interface 110 may include a wireless communication interface that includes modulators, demodulators, and antennas for a variety of wireless protocols including, but not limited to, Bluetooth™, Wi-Fi, and/or cellular communication protocols for communication over a computer network. Any other suitable communication interface, now known or hereafter developed, may be substituted.

The device 100 further includes a geolocation receiver 112. Geolocation receiver 112 may be any type of location-detecting system. For example, it may include a global positioning system, triangulation system, or other suitable technology. The geolocation receiver can be used to provide caller location information.

Figure 2:
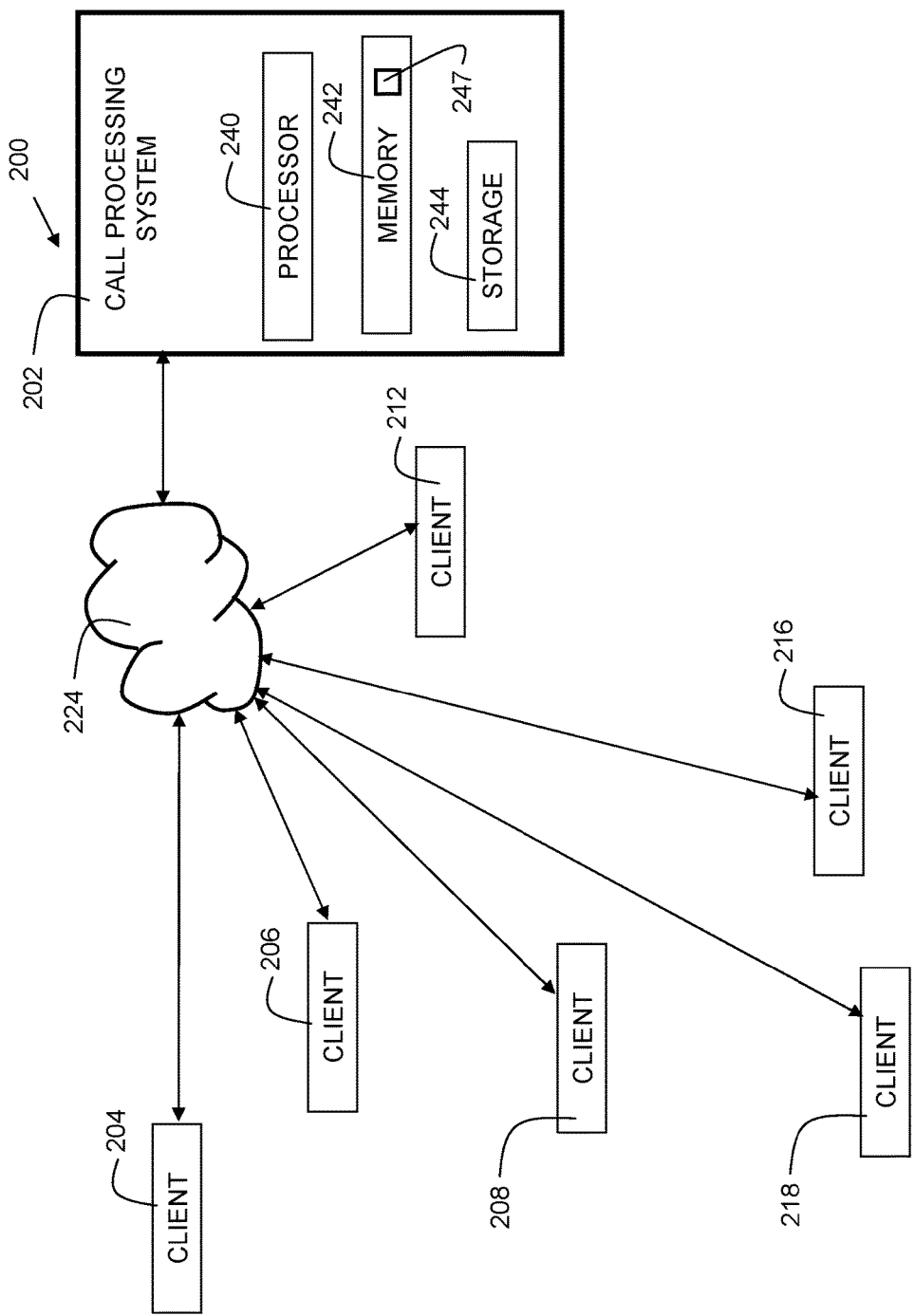
FIG. 2 is a diagram of an environment in which embodiments of the present invention may be implemented.

FIG. 2 is a diagram 200 of an environment in which embodiments of the present invention may be implemented. Call processing system 202 includes a processor 240, memory 242, and storage 244, for storing data and executing functions in accordance with embodiments of the present invention. In embodiments, call processing system 202 may be a telephony switch. In embodiments, call processing system 202 may be part of the network infrastructure of a cellular telephone service provider. In embodiments, the call processing system 202 may implement a Signaling System 7 (SS7) protocol. Call processing system 202 is in communication with network 224. Network 224 may be the Internet, local area network (LAN), wide area network (WAN), cloud network, or any other suitable network. The environment includes multiple client devices in communication with network 224, namely, client device 204, client device 206, client device 208, client device 212, client device 216, and client device 218. It should be recognized that although six client devices are shown for the purpose of disclosure, more or fewer may be included in implementations of the invention. The client devices may be smartphones or other suitable electronic devices.

The call processing system 202 may further include an analyzer 247. The analyzer may be configured to analyze a greeting when it is detected that the call is answered. The analyzer may further be configured to determine, based on the analysis, whether the call has been connected with a live user rather than a voicemail or answering machine. In embodiments, the analyzer may be implemented with a digital signal processor (DSP), and/or software stored in memory 244 and executed on processor 240.

Figure 3A:
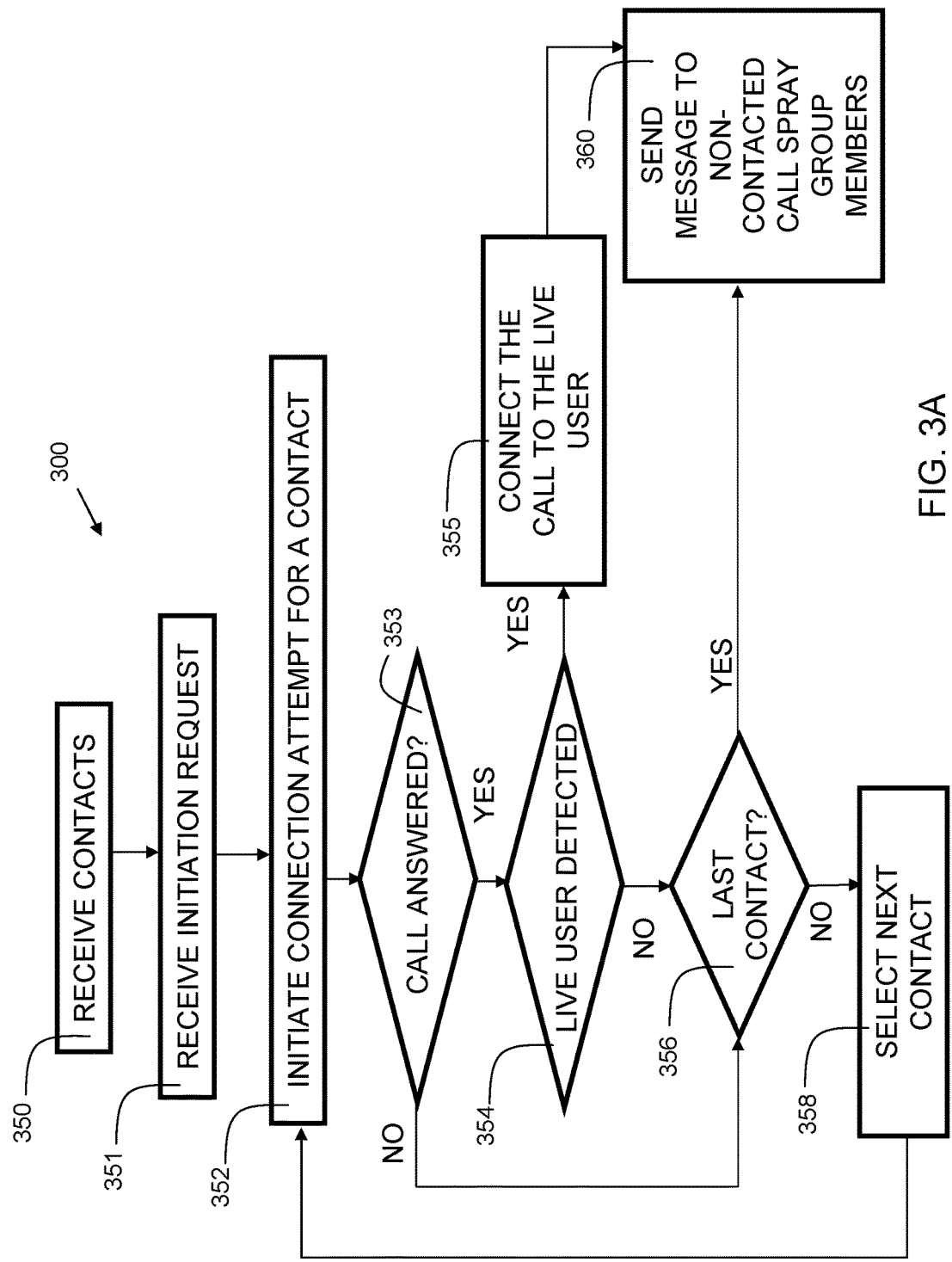
FIG. 3A is a flowchart indicating process steps for embodiments of the present invention.

FIG. 3A is a flowchart 300 indicating process steps for embodiments of the present invention. At block 350, a plurality of contacts is received by, for example, a telephony device such as call processing system 202 (FIG. 2). In some embodiments, the contacts may be an entire contact list, for example, from a user's smartphone. In some embodiments, the contacts may be a selected group of contacts, for example, imported to, or accessed from, a user's smartphone. In some embodiments, the contacts are a user-created group that is entered manually to the system, for example, through an application user interface. In some embodiments, the contacts are associated with a billing account of the caller. For example, all members of a "family plan" of a telephone service provider may comprise a group. The group of contacts is herein referred to as a "call spray group." In some embodiments, the step may include receiving a designation of a set of contacts as a call spray group. In some embodiments, the designation may include a name of the group, for example, "Emergency Contacts", "Parents", or "Co-Workers".

At block 351, an initiation request is received. The initiation request may be received by a call processing system from a caller's mobile device via, for example, the application user interface. In some embodiments, the steps of block 350 and 351 are executed in a single step, for example, via a single API allowing selection of the call group, as well as the initiation request. At block 352, a connection attempt is initiated by the call processing stem to one or more contacts received from a caller's mobile device. The caller's mobile device is an electronic device that may be a telephony device such as a smartphone, or other Internet-enabled electronic device capable of making voice calls. In some embodiments, the connection attempt may be the initiation of a phone call by dialing a phone number associated with the contact. At block 353, it is determined whether the call is answered. If yes, the flow proceeds to block 354, where it is determined if the call is answered by a live user. For the purposes of this disclosure, "live user" refers to a human being answering the call. If it is determined that the call is answered by a live user, the flow proceeds to block 355 where a connection is made between the live user and the caller. The flow then proceeds to block 360, where a message is sent, e.g., to each of the plurality of contacts for which a connection is not established. In some embodiments, each connection attempt may be initiated simultaneously. Thus, if there are five contacts within a call spray group, then a connection attempt may be initiated for all five contacts simultaneously. In other embodiments, one or more of the connection attempts may be performed in a sequential manner.

Figure 10:
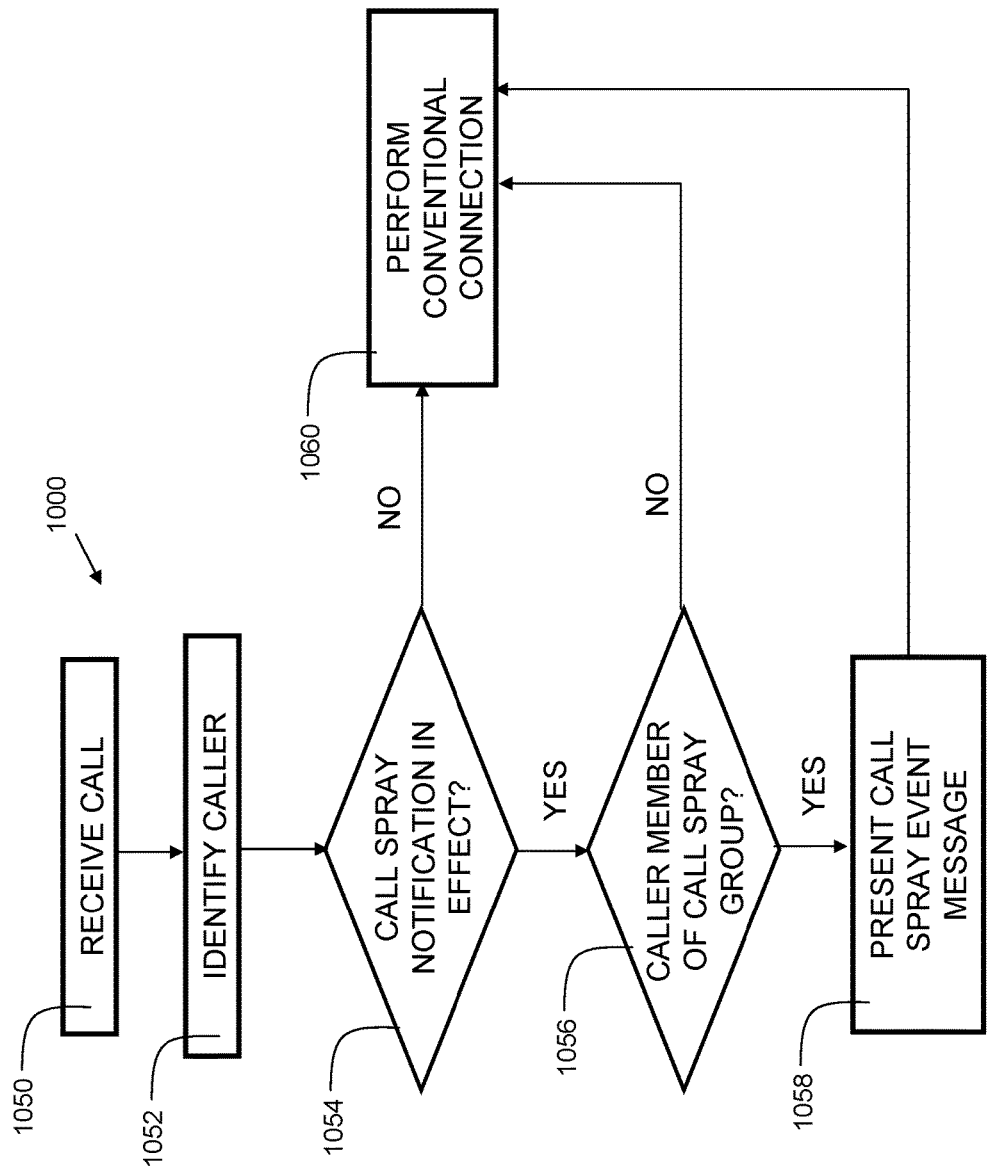
FIG. 10 is a flowchart indicating process steps for configuring a call spray event notification that is associated with each of the plurality of contacts for which a connection is not established.

If it is determined that the call is not answered at block 353, then the flow proceeds to block 356, where it is determined whether the process is at the last contact in the call spray group. If so, the flow proceeds to block 360, where a call spray message is sent to the members of the call spray group. If not, at block 358, a next contact is selected, and the flow proceeds to block 352. In the case where no live users answer a call, each member of the call spray group may receive a message indicating that the call was not answered by a live user. In alternate embodiments, the sending of the message may not occur immediately, but delivered at a future time (as illustrated in FIG. 10).

Embodiments may include using a voice analysis process to determine that a connection with the live user is established. An analyzer (such as analyzer 114 of FIG. 1) may analyze the greeting that is transmitted by the called device upon establishment of a connection. Based on the analysis, a determination may be made as to whether the call is answered by a live person or a voicemail/answering machine. Live users typically answer the phone using short greetings, such as "Hello", "Hi", or "This is Sarah". In contrast, voicemail/answering machine greetings are typically longer with more information, like "Hello, and thank you for calling John. I am away from my desk or on the other line. Please leave a message, and I will return your call as soon as possible." Accordingly, a threshold duration may be set, for example, at five seconds. If a duration of a detected greeting is over the threshold, it may be interpreted to be a voicemail/answering machine instead of a live user.

Figure 3B:
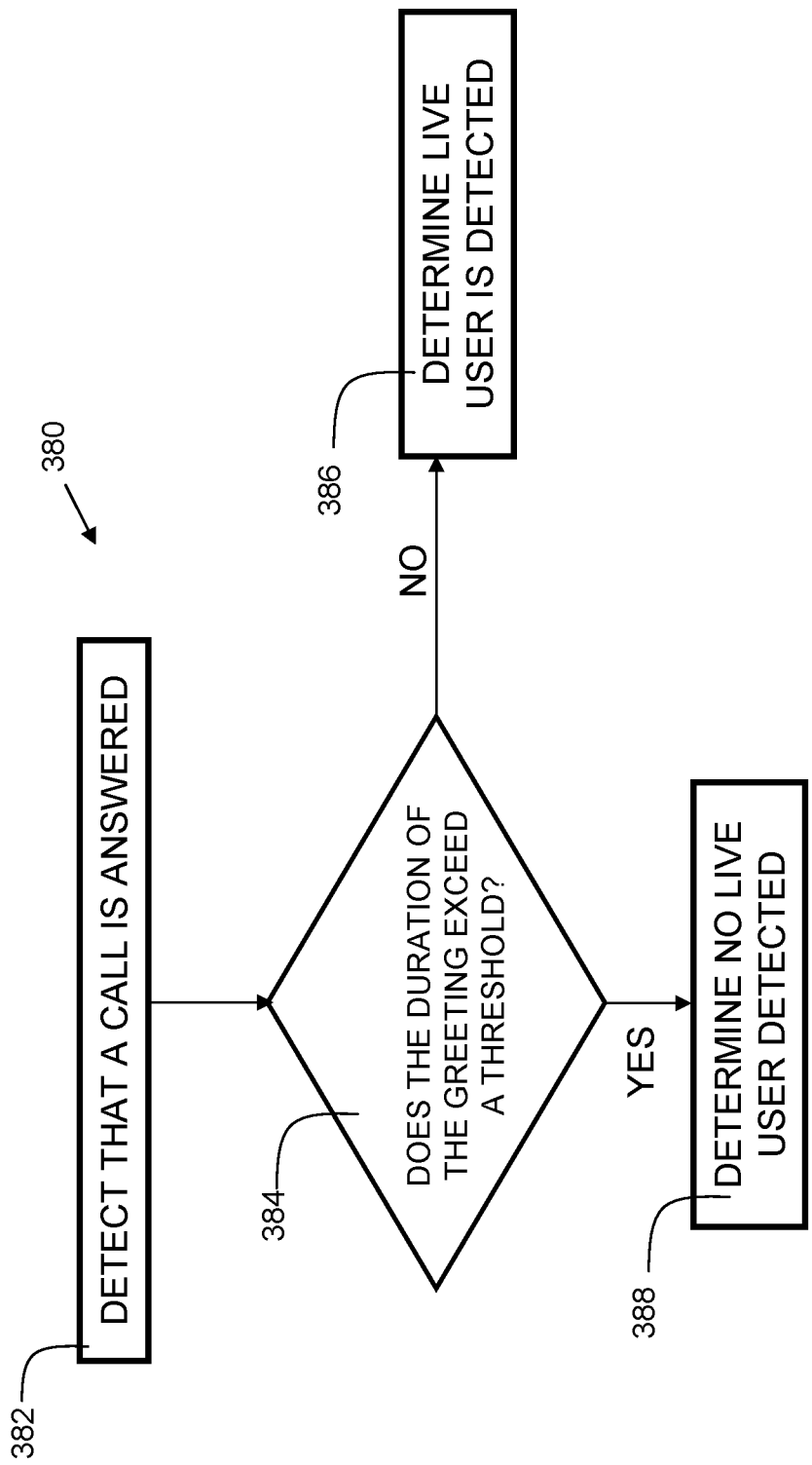
FIG. 3B is a flowchart indicating additional process steps for embodiments of the present invention.

FIG. 3B shows a subprocess 380 for determining whether a live user is detected (see block 354 of FIG. 3A). At block 382, it is detected that the call is answered. At block 384, it is determined whether the greeting is of a length that exceeds the threshold. If not, the flow proceeds to block 386 where it is determined that a live user is detected. If so, the flow proceeds to block 388 where it is determined that a live human is not detected. In embodiments, the threshold may be five seconds. Thus, in embodiments, the voice analysis process includes measuring a greeting duration. It should be recognized that this is an example analysis, and that other suitable processes are possible. In embodiments, the operations indicated in FIG. 3A and FIG. 3B are performed by the call processing system 202 (FIG. 2).

In some embodiments, other parameters may be analyzed instead of, or in addition to, greeting length. For example, tone of voice may be analyzed, or the presence of background noise. For example, if background noise is detected, it may be determined that it is a live user since people usually record voicemail/answering machine greetings in a quiet place. Additionally, sometimes when a user answers the phone, s/he may be in a public place where there is background noise present such as people talking or cars driving on streets.

Figure 4:
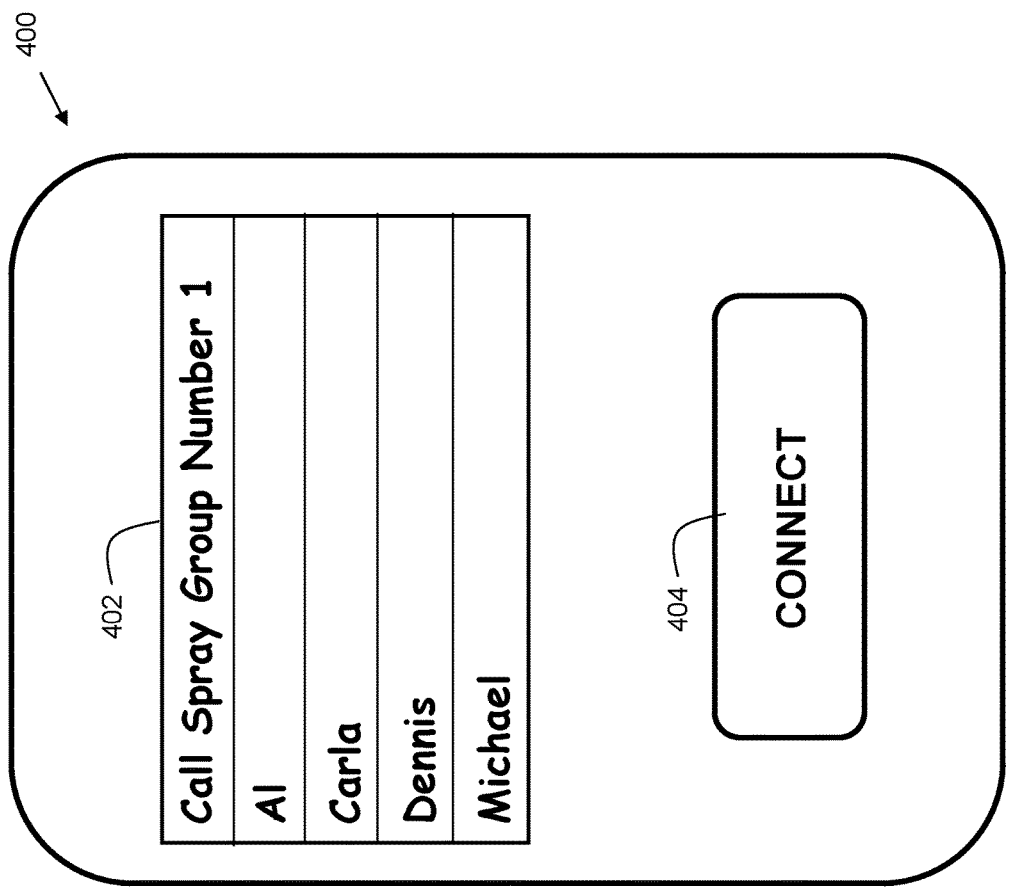
FIG. 4 is a sample call spray group in accordance with embodiments of the present invention.

FIG. 4 is a sample call spray group 400 in accordance with embodiments of the present invention. The call spray group may be displayed on the screen of a mobile device or computer, for example, by an application. In the example, the user has assigned four contacts—Al, Carla, Dennis, and Michael—to a group designated by the name "Call Spray Group Number 1" 402. The assignment may be made through selection via a touchscreen or other suitable user interface. Although only the contact names are shown on the screen, contact information associated with each contact name is associated therewith. The user may initiate a call to the contacts in Call Spray Group Number 1 by clicking with a mouse cursor, pressing a touch sensitive screen, or otherwise selecting the "Connect" button 404. It should be recognized that the sample screen display shown is an example, and other configurations are included within the scope of embodiments of the invention.

Figure 5A:
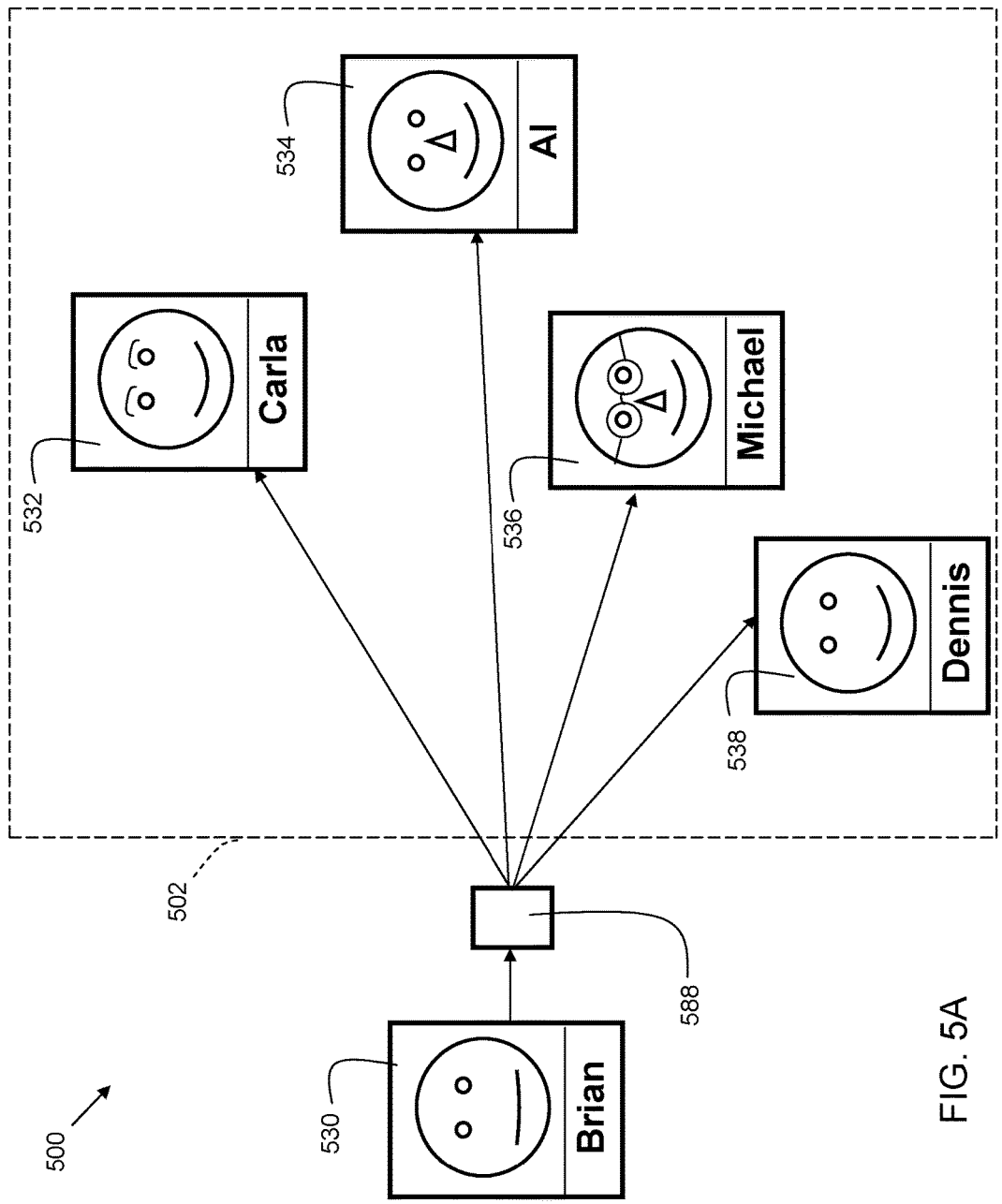
FIG. 5A shows an illustration representation of a call spray group prior to a live user connection.

FIG. 5A shows an illustration representation of a group of contacts prior to a live user connection. In the example, there are four contacts in call spray group 500. Brian, the caller who has created the call spray group 502 in his smartphone, is represented at 530. Dennis is represented at 538. Michael is represented at 536. Al is represented at 534. Carla is represented at 532. In the example, Brian 530 initiates a call, via his mobile electronic device communicating with call processing system 588, which in turn attempts a connection with each of the contacts in call spray group 502.

Figure 5B:
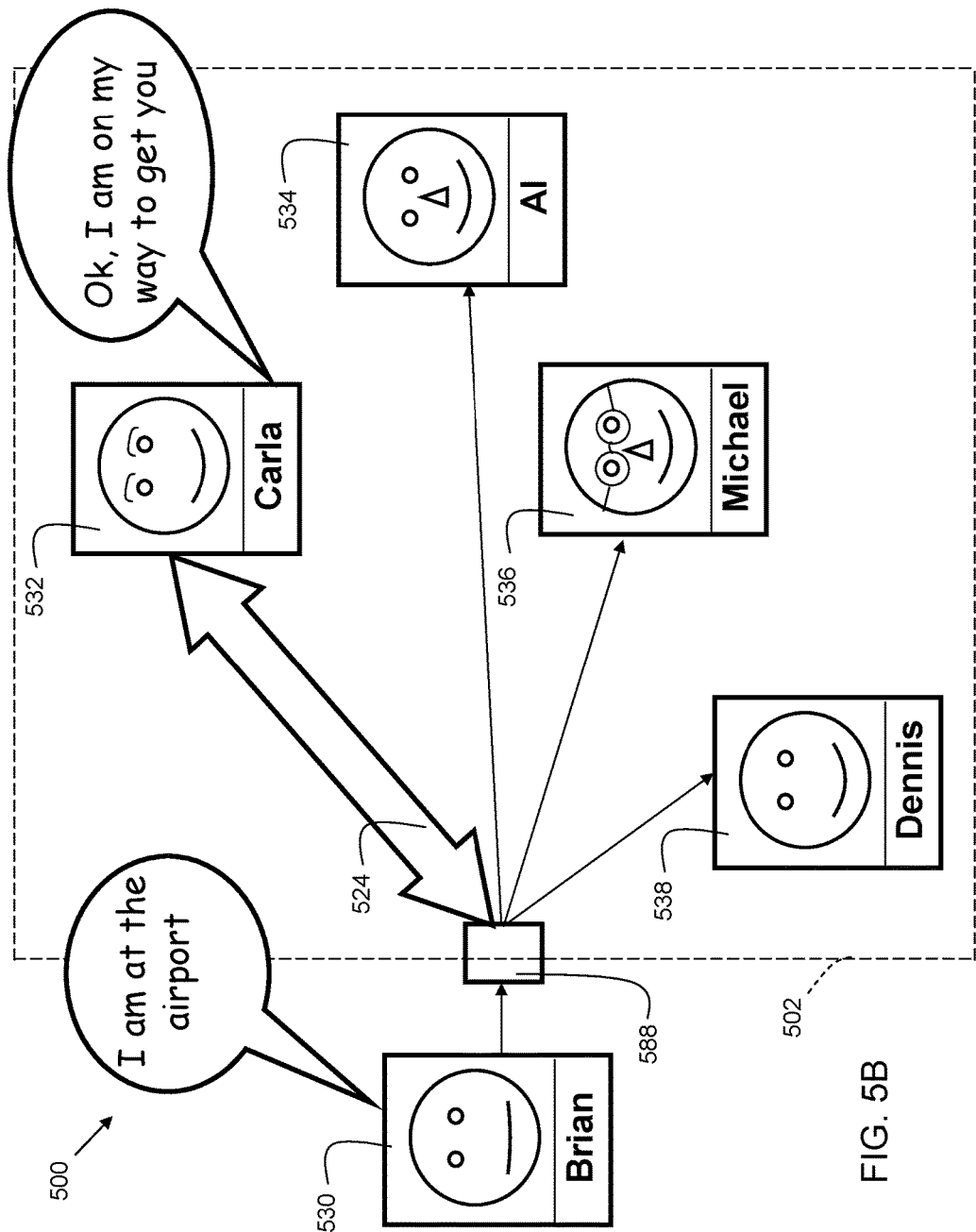
FIG. 5B shows an illustration representation of a call spray group after a live user connection.

FIG. 5B shows an illustration representation of a call spray group after a live user connection. Brian 530 initiates a call to call spray group 502. In the example, the embodiment of the invention is implemented as an application on the caller's smartphone. Embodiments place a call to Al 534, but Al 534 fails to pick up the phone. After five rings, embodiments terminate the call, and place a call to Michael 536. Michael 536 is away from his device, and the associated voicemail answers after four rings. The voicemail greeting recites 10 seconds of information. Embodiments determine that it is not a live user based on the greeting exceeding a predetermined threshold of five seconds. Embodiments terminate the call, and place a call to Carla 532. Carla 532 answers her phone as a "live user." Embodiments connect the call between Carla 532 and Brian 530. The connection is represented at arrow 524. Carla 532 says, "Hello." Brian 530 replies "I am at the airport." Carla 532 replies "OK, I am on my way to get you." Brian 530 says "I am at the baggage carousel for terminal D. I will be waiting near the counter." Carla 532 then replies, "Great, see you soon." Carla 532 and Brian 530 each hang up their respective phones, terminating the call. In some embodiments, the connection attempt to each electronic device associated with the call spray group may be performed simultaneously. In such embodiments, once it is determined that a connection is made with an electronic device associated with a live user, the electronic devices associated with the other (non-answering) members of the call spray group may receive a message that a call spray event occurred.

Figure 6:
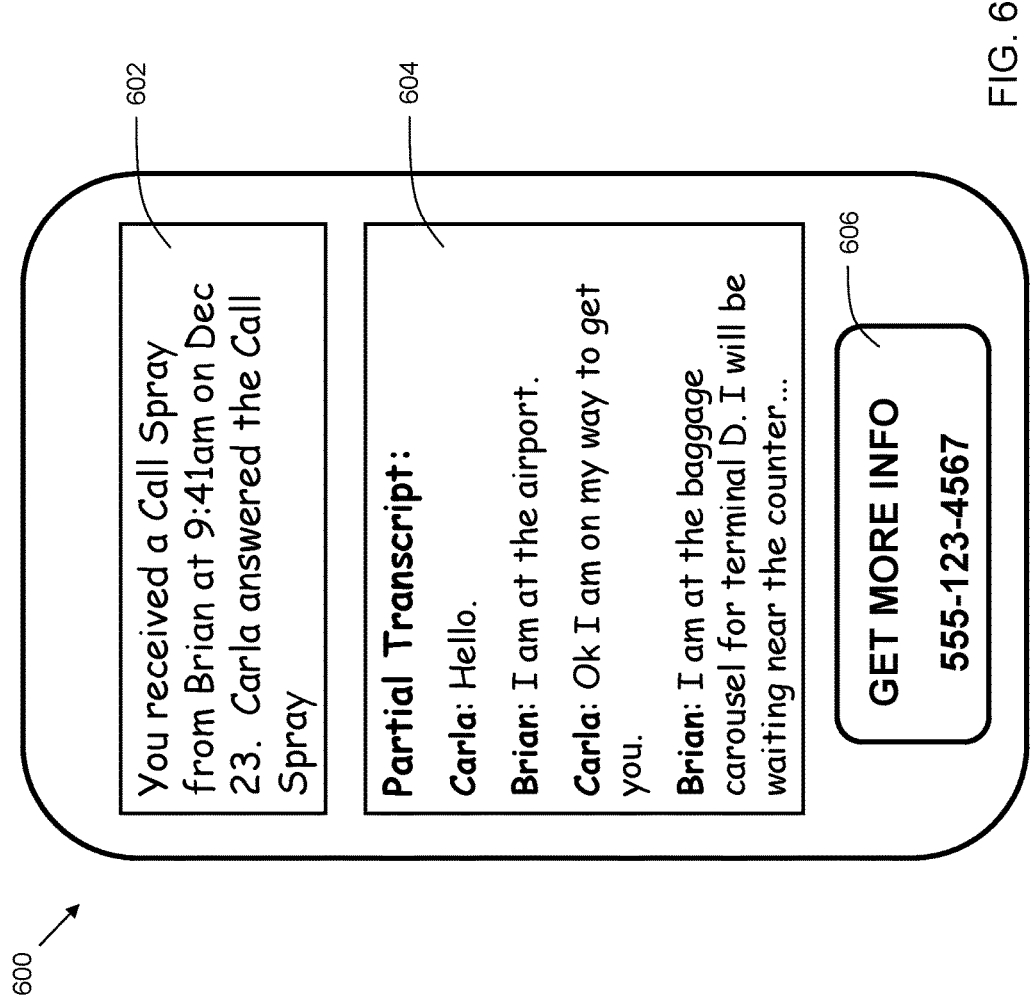
FIG. 6 is an example call acknowledgement message in accordance with embodiments of the present invention.

FIG. 6 is an example call acknowledgement message 600 in accordance with embodiments of the present invention, based on the example described for FIG. 5B. In some embodiments, the message 600 may be an SMS or MMS message. In some embodiments, the message 600 may be an email message. In some embodiments, the message 600 is sent to all users in the call spray group. In some embodiments, the message 600 is further sent to the caller. In some embodiments, the message 600 is only sent to the contacts in the call spray group other than the live user who answered the call. In some embodiments, the message 600 is sent in response to the caller hanging up the phone following a connection. In some embodiments, the message 600 is sent in response to the live user hanging up the phone following a connection. In some embodiments, the message 600 is sent in response to the disengagement of the call.

In some embodiments, the message 600 may include notification 602. Notification 602 may include an indication that a call spray was received, the identity of the caller and the identity of the live user. In some embodiments, the message 600 may further include a partial transcript 604 of the conversation between the live user and the caller. The users' voices may be captured by a microphone on the caller's and the live user's electronic devices (e.g. phones). The transcript may be produced using a speech-to-text system that is executed on, or connected to, call processing system 202 using data received from the voice channel of a telecommunications connection. A predetermined duration, for example, the first 15 seconds of a call may be transcribed. In embodiments, the message includes a callback number 606 associated with a voice recording including the full conversation with the live user and the caller. This telephone number 606 may be provided by a telephone service provider. The recording of the conversation may be stored on the call processing system 202 and streamed to a device upon request.

Some embodiments include connecting with a second live user, in addition to the first live user, associated with one contact of the plurality of contacts (in call spray group). A conference call is formed between the caller, the first live user, and the second live user. In such cases, the message 600 may further include the name of the second live user.

In some embodiments, instead of a partial transcript as shown in 604, a computer-generated conversation summary may be displayed on an electronic device. The computer-generated conversation summary may be created by the call processing system (202 of FIG. 2) or other system in communication with the call processing system. In embodiments, the generation of the computer-generated conversation summary may include performing an extraction-based summarization process and/or an abstraction-based summarization process. One or more natural language processing (NLP) techniques may be used to preprocess a conversation prior to creating a computer-generated conversation summary. These techniques may include, but are not limited to, tokenization, part of speech identification, bigram analysis, keyphrase extraction, and/or entity detection.

Figure 7:
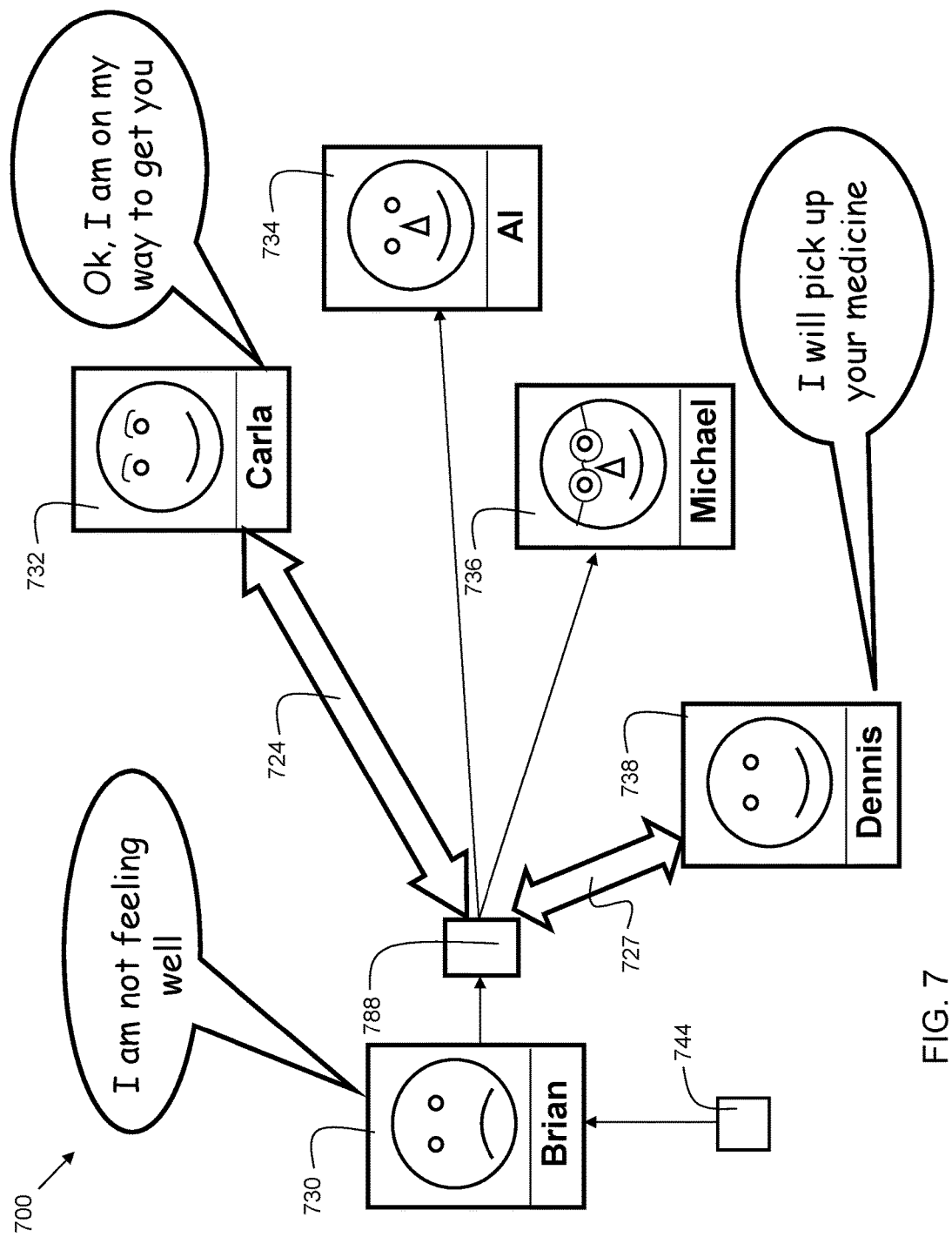
FIG. 7 shows an illustration representation of a call spray group after multiple live user connections.

FIG. 7 shows a representation 700 of a call spray group after multiple live user connections. In the example, Brian 730 initiates a call, via his mobile electronic device communicating with call processing system 788, which in turn attempts a connection with each of the electronic devices associated with contacts in the call spray group. In the example, Brian 730, the caller, is first connected with Carla 732, a live user, in a similar manner as described with respect to Brian 530 and Carla 532 in FIG. 5B. However, in the current example, calls are continued to the remaining contacts in the list of contacts even after a first connection is made. In the example, embodiments place a call to Dennis 738, after Brian 730 and Carla 732 are connected. Dennis 738 answers his phone, and embodiments determine that Dennis 738 is a live user. The call between Brian 730 and Carla 732 is switched to a conference call including Brian 730, Carla 732, and Dennis 738 on the line, as indicated by connection arrows 724 and 727. In the example, the conversation flows as follows. Brian 730 says, "I am not feeling well." Carla 732 says, "Okay, I am on my way to get you." Dennis 738 then says, "I will pick up your medicine." Al 734 and Michael 736 do not participate in the conference call. Al 734 and Michael 736 may instead receive a call spray notification message on their telephony device indicating the details of the call spray operation in accordance with some embodiments of the invention.

A sensor 744, either included on the caller's (Brian 730) smartphone (device) or in communication with such smartphone, may send information to embodiments of the invention for inclusion in a call spray group message. The sensor 744 may be any suitable sensor. For example, it might be a biometric sensor, such as heart rate, pulse, or blood pressure sensor. In some embodiments, the sensor may be an environmental sensor, such as moisture, barometric pressure, etc. The caller's device may send a reading of the sensor 744 to embodiments for inclusion in a message. In some embodiments, more than one sensor may be provided.

Figure 8:
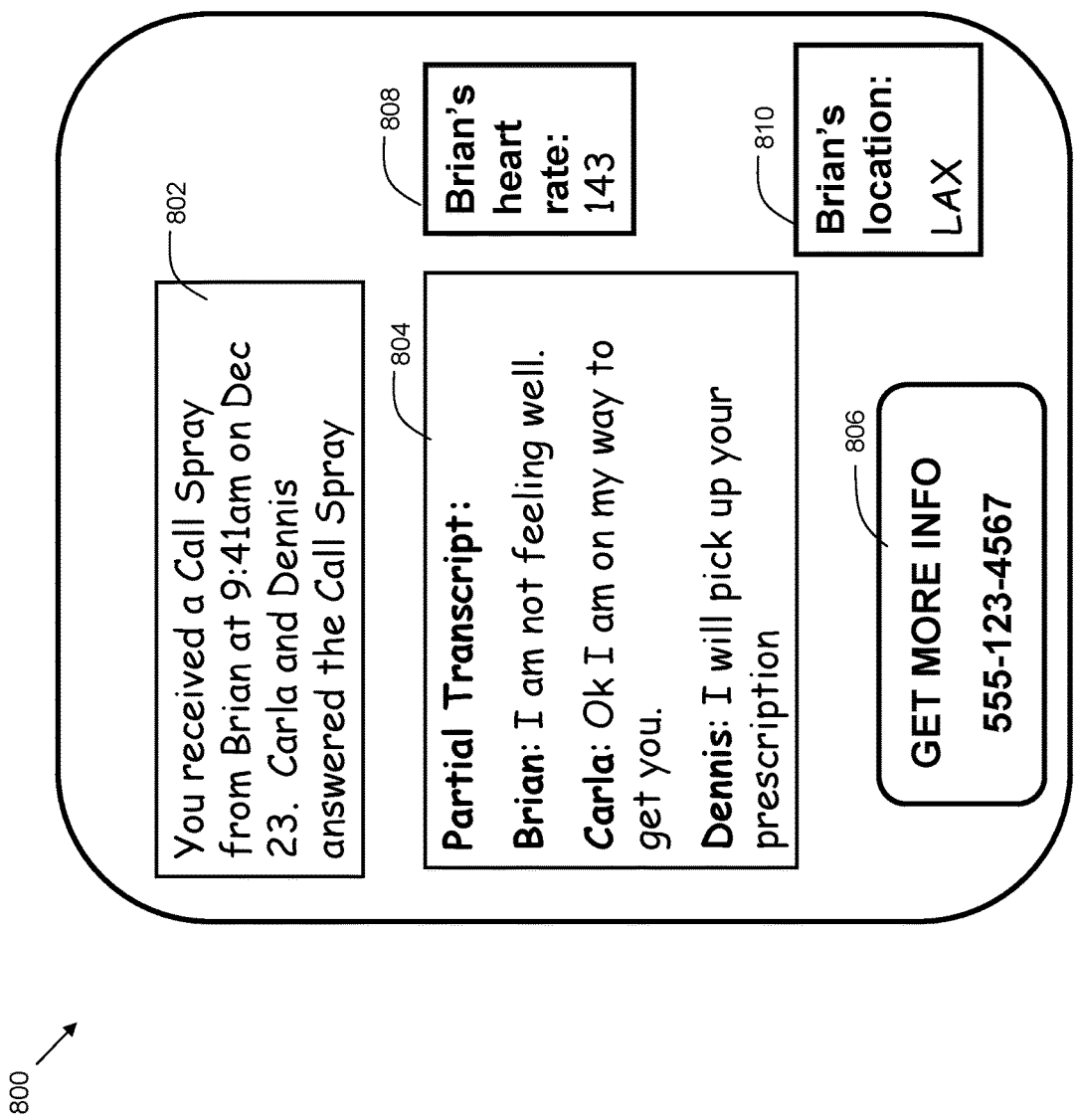
FIG. 8 is another example call acknowledgement message in accordance with embodiments of the present invention.

FIG. 8 is another example call acknowledgement message 800, related to the example of FIG. 7, in accordance with embodiments of the present invention. In some embodiments, the message may be a SMS or MMS message. In some embodiments, the message 800 may be an email message. In some embodiments, the message 800 may be sent to all users in the call spray group. In some embodiments, the message 800 may be further sent to the caller. In some embodiments, the message 800 is only sent to the contacts in the call spray group other than the live users.

In some embodiments, the message 800 may include notification 802. Notification 802 may include an indication that a call spray was received, the identity of the caller, and the identity of the live user. In some embodiments, the message 800 may include a partial transcript 804 including a portion of the conversation among the first live user, the second live user, and the caller. The transcript may be produced using a speech-to-text capability. A predetermined duration, for example, the first 25 seconds, of a call may be transcribed. In some embodiments, the message 800 includes a callback number 806 associated with a voice message including the recorded conversation with the live user, the second live user, and the caller. This telephone number 806 may be provided by a telephone service provider. The recording of the conversation may be stored on the call processing system 202 and streamed to a device upon request.

In some embodiments, message 800 further includes information 808 from a sensor coupled to the smartphone of the caller (e.g., sensor 744 (FIG. 7)). In some embodiments, the sensor is a biometric sensor, for example, to measure heart rate. In the example, the reading is of a heart rate sensor, but in implementations, the sensor may be any suitable sensor. In other embodiments, it may be a name or address associated with the location associated with the coordinates. This can be used to provide important health information, such as vital statistics for a sick patient, for example.

In some embodiments, message 800 may further include the caller's location 810. In some embodiments, the caller's location may be the latitude and longitude coordinates of the caller's user device as determined by the geolocation receiver integrated with the caller's smartphone. The geolocation receiver may include a global positioning system or other suitable technology.

Figure 9:
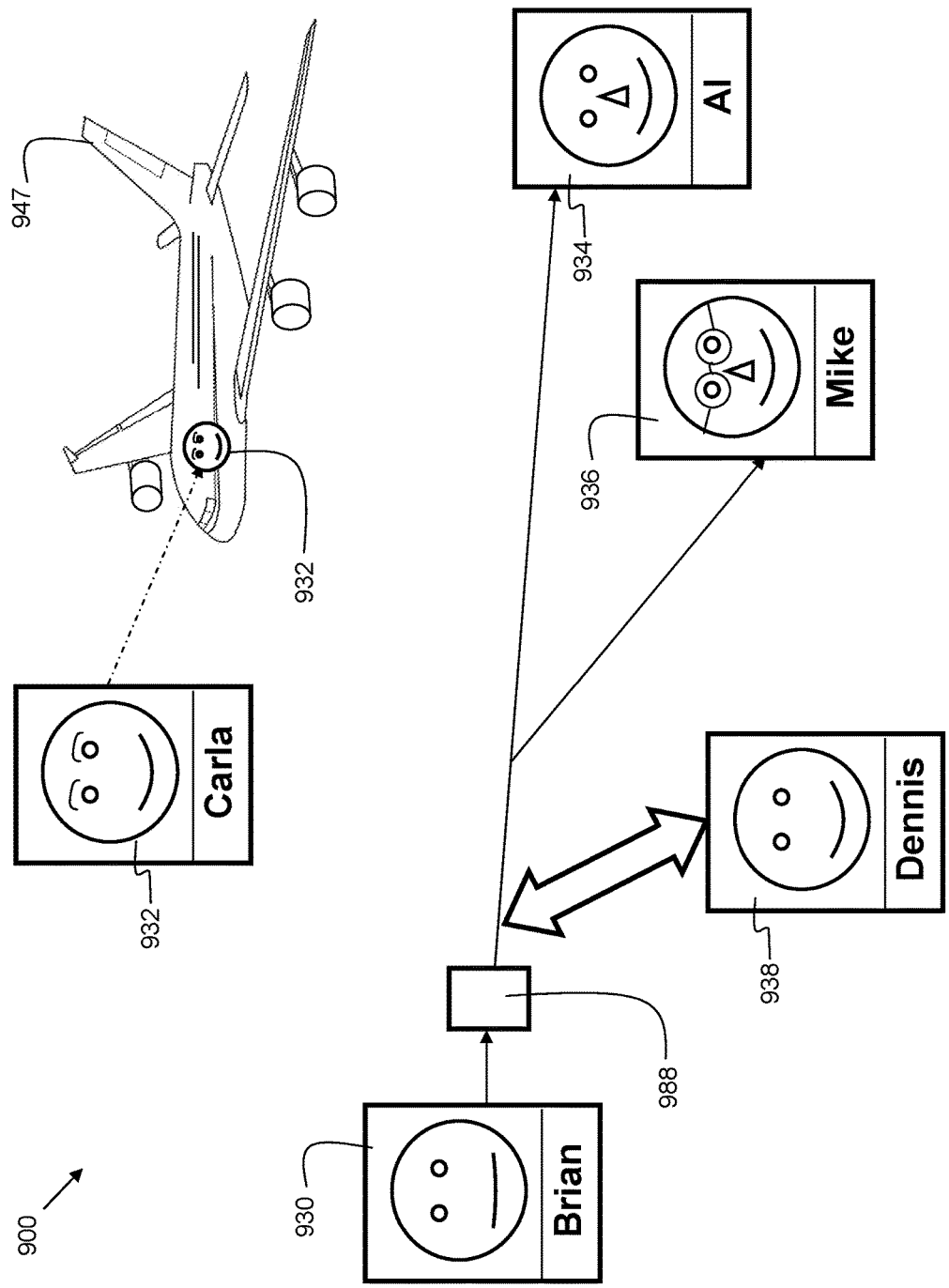
FIG. 9 shows a representation of a call spray group containing an inaccessible group member, after a live user connection.

FIG. 9 shows a representation of a call spray group containing an inaccessible group member after a live user connection. In some instances, a member of the call spray group may be inaccessible, and/or may have his/her electronic device disabled. In the example, Brian 930 initiates a call, via his mobile electronic device communicating with call processing system 988, which in turn attempts a connection with each of the electronic devices associated with contacts in call spray group. In the example of FIG. 9, Carla 932 is currently on an airplane 947 with no access to the telephony system. Thus, when Brian 930 places his call spray and a live connection is established with the electronic device associated with Dennis 938, then the electronic devices associated with Mike 936, and Al 934 may receive a missed call notification, but the electronic device of Carla 932 may not receive any indication that a call spray occurred, as she was in the airplane 947 at that time.

When Carla 932 arrives at her destination and deplanes, she may decide to call Brian 930, not realizing that a call spray had occurred. In this embodiment, as a result of the call spray, the telephony system is configured with a call spray event notification that is associated with each of the plurality of contacts for which a connection is not established. Thus, when Carla 932 calls Brian 930, she is first presented with a call spray event notification, which can include a voice message indicating that Brian 930 made a call spray, and that Dennis 938 was the live user that answered the call spray.

In some embodiments, a caller-ID function may be used to determine the identity of the caller. In the example, if Carla 932 calls from her mobile device, the call processing system 202 can recognize the telephone number as belonging to Carla 932, and present her with the call spray event notification, which includes details about the call spray, and in some embodiments, includes the name of the live user that was connected during the call spray.

In some embodiments, the call processing system (202 of FIG. 2) may associate multiple telephone numbers with a member of the call spray group. In embodiments, this may be based on a contact database stored in the user's mobile device and/or residing on a server accessible by the network (e.g., 224 of FIG. 2). In this way, if Carla 932 calls Brian 930 from her home telephone, work telephone, or other telephone that is part of her contact record, the call processing system may associate the call as coming from Carla 932 and presents the call spray event notification to her. Thus, when Carla 932 calls Brian 930, she first hears information about the call spray. When the call spray event notification is complete, she may have an option to connect to Brian 930, leave Brian 930 a voicemail, and/or disconnect.

FIG. 10 is a flowchart 1000 indicating process steps for configuring a call spray event notification that is associated with each of the plurality of contacts for which a connection is not established. At process step 1050, a call is received by the call processing system. At process step 1052, the caller is identified. In some embodiments, the caller may be identified based on the telephone number of the caller. In other embodiments, the call processing system may utilize voiceprint technology to identify the voice of the caller. In this way, the caller can call from any telephone and still be identified. In other embodiments, the caller may enter a code when placing a call to provide an identification of the caller.

At process step 1054, a check is made to determine if a call spray notification is in effect. If not, then a conventional connection is performed at 1060. The conventional connection may include attempting to reach a live user, followed by connection to a voicemail system if the live user does not answer. If yes, then at process step 1056, a check is made to determine if the caller identified at process step 1052 is part of the call spray group. If not, then a conventional connection is performed at 1060. If yes, then a call spray event notification message is presented to the user at process step 1058. The call spray event notification may include a name of the live user, a partial or complete recording of the conversation between the call spray originator and the live user, and/or additional information. In some embodiments, after process step 1058 completes, the caller may be provided an option to perform a conventional connection at process step 1060.

FIG. 11A shows an exemplary user interface indicating a plurality of missed call notifications. In this example, the user identification field 1102 of the user interface indicates that the device 1100 belongs to Mike (936 of FIG. 9). The missed call log 1104 indicates calls from Al, Brian, and David. The call from Brian is a result of the call spray operation described and shown in FIG. 9. In some embodiments, it may be desirable to remove a missed call notification that resulted from a call spray. This can be the case when a live user answers and resolves the issue of the call spray originator (the caller). In such a situation, the call spray originator may wish to remove the missed call notification, so that the call spray originator is not flooded with multiple return calls for an issue that has already been resolved.

Figure 11B:
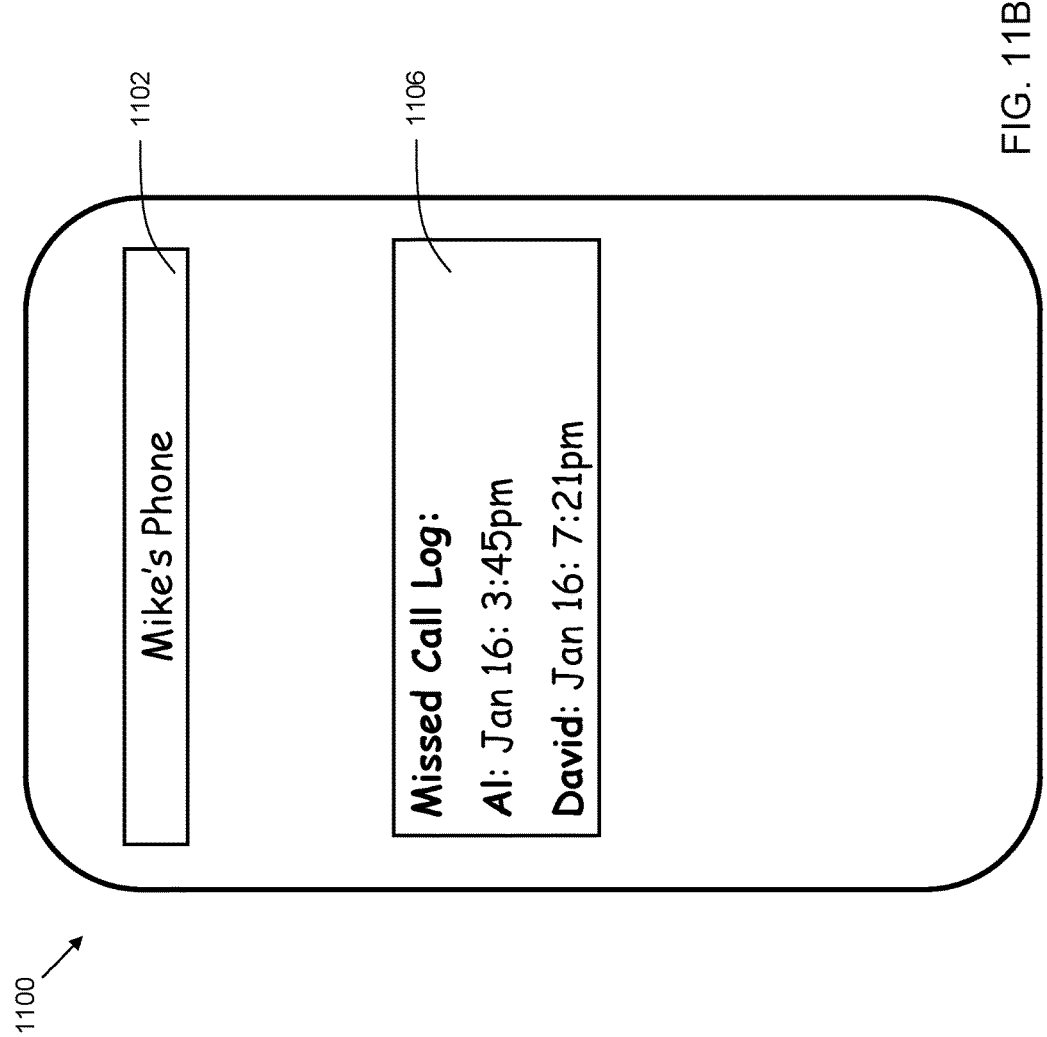
FIG. 11B shows an exemplary user interface after removal of a missed call notification that was part of a call spray.

In embodiments, the device 1100 may include an API or other software component that allows a missed call notification to be removed when a call spray operation connects with a live user. In embodiments, the call processing system (202 of FIG. 2) may send a message to the device 1100 once the call spray operation successfully connects to a live user, instructing the device 1100 to remove the missed call notification from the missed call log 1104. FIG. 11B shows the resulting missed call log 1106, which removes Brian from the list. As a result, when Mike checks his telephone missed call log, he does not see the call spray from Brian, since it was successfully answered by Dennis (938 of FIG. 9).

FIG. 12 shows an exemplary user interface 1200 for establishing configuration options. Option 1202 includes a checkbox to enable removal of missed call notifications. This feature allows missed call notifications from a call spray that was answered by a live user to be removed from the device if the call spray successfully connected with a live user. Option 1204 includes selections for sharing call spray notifications. In embodiments, one option allows the call spray notifications to be shared amongst members of the call spray group. Another option allows the call spray notifications to be shared with everyone. As shown in FIG. 12, a radio button is currently enabling the option for sharing call spray notifications amongst members of the call spray group. If, instead, the option to share call spray notifications with everyone is selected, then when a caller calls the user, the call spray notification is shared with the caller, even if the caller is not part of the call spray group. Other sharing options are possible.

Option 1206 includes selections for deactivating a call spray notification. As shown, the call spray notifications are deactivated after one hour. Referring again to the example of FIG. 9, with option 1206 set to "one hour," if Brian 930 issues a call spray at 9:00 pm, and Carla 932 calls Brian 930 at 9:50 pm, she will be presented with the call spray notification, since it is less than one hour since the call spray occurred. If instead, Carla 932 calls Brian 930 at 10:01 pm, Carla 932 will not be presented with the call spray notification, since it has been more than one hour since the call spray occurred. Instead, at 10:01 pm, Carla 932 will be connected via a conventional connection to Brian 930, to reach Brian as a live user, or reach his voicemail if he does not answer. Note that while checkboxes and radio buttons are shown in user interface 1200, other user interface controls are possible. Furthermore, some embodiments may include more or fewer selections than what is shown in FIG. 12.

It should be recognized that although embodiments of the invention are described herein as implemented using cellular smartphones, other implementations are included within the scope of embodiments of the invention as well. For example, some implementations may, instead of using cellular phone technology, may utilize VoIP, video conferencing, other communications mechanisms, or any combination thereof.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for performing a multiple party call acknowledgement, comprising:
    receiving a plurality of contacts on a call processing system from an electronic device of a caller;
    initiating a connection attempt to each of the plurality of contacts with the call processing system;
    connecting with an electronic device of a live user associated with one contact of the plurality of contacts such that the live user and the caller may have a conversation;
    configuring a call spray event notification in response to the connecting, wherein the call spray event notification includes a transcript of the conversation; and
    sending a message, comprising the call spray event notification, to each of the plurality of contacts for which a connection is not established.

2. The method of claim 1, further comprising providing the call spray event notification to an electronic device.

3. The method of claim 1, further comprising removing a missed call notification from a non-answering contact from the plurality of contacts in response to connecting with the electronic device of the live user.

4. The method of claim 1, wherein the call spray event notification includes a name of the live user.

5. The method of claim 1, wherein the call spray event notification includes a voice recording including conversation with the live user and the caller.

6. The method of claim 1, wherein the message includes a name of the live user.

7. The method of claim 1, wherein the message includes a callback number associated with a voice recording including conversation with the live user and the caller.

8. The method of claim 1, wherein the receiving the plurality of contacts comprises receiving a selection of contacts associated with a billing account associated with the electronic device of the caller.

9. The method of claim 1, wherein the receiving the plurality of contacts comprises receiving a selection of contacts associated with a user-created group.

10. The method of claim 1, further comprising:
connecting the electronic device of the caller with an electronic device of a second live user associated with one contact of the plurality of contacts; and
forming a conference call between the electronic device of the caller, an electronic device of the live user, and the electronic device of the second live user.

11. The method of claim 10, wherein the conversation also includes the second live user.

12. The method of claim 10, wherein the message includes a callback number associated with a voice message including conversation with the live user, the second live user, and the caller.

13. The method of claim 1, wherein the message further includes biometric information from a biometric sensor coupled to the electronic device of the caller.

14. The method of claim 13, wherein the biometric information includes a heart rate.

15. An electronic communication device comprising:
a processor;
a memory coupled to the processor, the memory containing instructions, that when executed by the processor, perform the steps of:
receiving a plurality of contacts on a call processing system from an electronic device of a caller;
initiating a connection attempt to each of the plurality of contacts with the call processing system;
connecting with an electronic device of a live user associated with one contact of the plurality of contacts such that the live user and the caller may have a conversation;
configuring a call spray event notification in response to the connecting, wherein the call spray event notification includes a transcript of the conversation; and
sending a message, comprising the call spray event notification, to each of the plurality of contacts for which a connection is not established.

16. The electronic communication device of claim 15, wherein the message includes a name of the live user.

17. The electronic communication device of claim 15, further comprising a geolocation receiver configured and disposed to determine a location of the electronic device of the caller, and wherein the message includes the location of the electronic device of the caller.

18. The electronic communication device of claim 15, the memory further containing instructions, that when executed by the processor, perform the steps:
connecting the electronic device of the caller with an electronic device of a second live user associated with one contact of the plurality of contacts; and
forming a conference call between the electronic device of the caller, an electronic device of the live user, and the electronic device of the second live user.

19. A computer program product for performing a multiple party call acknowledgement, for an electronic computing device comprising a computer readable hardware storage device having program instructions embodied therewith, the program instructions executable by a processor to cause the electronic computing device to:
receive a plurality of contacts on a call processing system from an electronic device of a caller;
initiate a connection attempt to each of the plurality of contacts with the call processing system;
connect with an electronic device of a live user associated with one contact of the plurality of contacts such that the live user and the caller may have a conversation;
configure a call spray event notification in response to the connecting, wherein the call spray event notification includes a transcript of the conversation; and
send a message, comprising the call spray event notification, to each of the plurality of contacts for which a connection is not established.

20. The computer program product of claim 19, wherein the computer readable hardware storage device includes program instructions executable by the processor to cause the electronic device to:
connect the electronic device of the caller with an electronic device of a second live user associated with one contact of the plurality of contacts; and
form a conference call between the electronic device of the caller, the electronic device of the live user, and the electronic device of the second live user.

* * * * *